May 21, 1968 W. WINGEN 3,384,412
ADJUSTABLE PROTECTIVE FRAME HOOD
Filed June 4, 1965 4 Sheets-Sheet 4

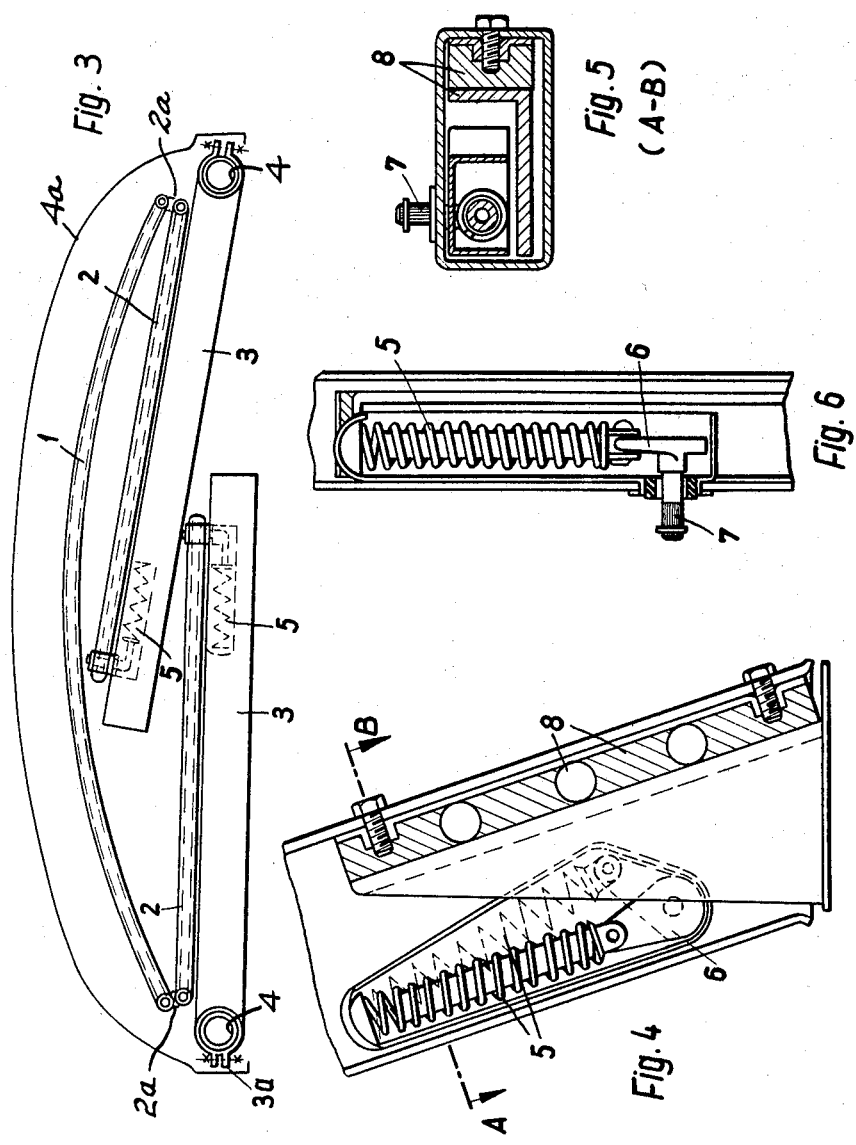

(C-D)

United States Patent Office 3,384,412
Patented May 21, 1968

3,384,412
ADJUSTABLE PROTECTIVE FRAME HOOD
Wilhelm Wingen, Grosshelfendorf, uber Munich, Germany, assignor to Georg Fritzmeier, KG, Grosshelfendorf uber Munich, Germany, a limited partnership
Filed June 4, 1965, Ser. No. 461,408
Claims priority, application Germany, June 5, 1964, F 43,100
5 Claims. (Cl. 296—84)

The invention relates to an adjustable protective frame hood with a front windscreen which can be swung up into a position above the driver in order to permit free front entry. In particular the invention relates to a collapsible protective frame hood which is complete with a front windscreen and which can be completely folded up and safely transported in the folded condition.

Hoods for mobile working machines, particularly machines for agriculture, forestry, or the building industry are frequently delivered separately. In addition they are frequently subject to considerable wear and therefore have to be replaced. Moreover, when they originate from different manufacturers, the working machines also have different dimensions of the substructure to which the hood is to be fastened. Hoods having different dimensions or hoods having adaptors to fit various substructure dimensions are therefore frequently produced and mounted on mobile working machines. For this purpose rigid constructions which cannot be folded are frequently selected, particularly when such constructions constitute the entire superstructure. This was also necessary particularly for the reason that it was desired to provide a certain protection to the driver in the event of a vehicle having a hood of this type overturning.

It has recently been proposed that in order to enable the driver to enter the mobile working machine from the front without hindrance the front windscreen should be so disposed as to be capable of pivoting upwards about a horizontal axis until it lies above the driver. The windscreen may be able to be raised until the plane of its glazing lies horizontally. This can be achieved by means of side arms acting on the windscreen and projecting out of the plane of the latter. In particular the pivoting axis is then disposed behind the windscreen. A hood construction of this type, although excellently complying with the requirement for unhindered front entry, still does not permit complete foldability, particularly for the purpose of separate transport of the hood.

The object of the invention is to provide an adjustable protective frame hood which can be completely folded up and unfolded and at the same time can be adapted to all usual substructure dimensions, for example on mobile working machines, and also to permit free front entry for the driver, while in addition in the position of use ensuring protection for the compartment structure or driver's cab structure in the event of the overturning of the vehicle.

The adjustable protective frame hood according to the invention, with a front windscreen adapted to be raised above the driver to permit free front entry, consists of a supporting frame which is composed of adjustable supporting arms disposed on the left-hand and right-hand sides and on which a roof frame is adjustably articulated; the horizontal pivoting axis of the front windscreen is disposed in a horizontal plane approximately in the bottom region of the front windscreen; in addition, pivoting aids furnished with springs are provided for the front windscreen. The entire protective frame hood with front windscreen is mounted on or lifted off the substructure, for example of a mobile working machine, and by swinging out the supporting arms, which are pivotable in relation to the roof frame, can be adapted in width to the substructure.

In one particular embodiment the pivoting axis of the front windscreen is disposed approximately in the horizontal plane of the lower edge of the front windscreen. The front windscreen is preferably constructed with a middle pane and two side panes, disposed respectively on the left-hand and right-hand sides and pivotally connected to the middle pane. In this way the entire windscreen is formed of three individual panes which can be pivoted in relation to one another and folded, particularly for the purpose of adaptation to the width of a substructure and when swung up. The side panes carry tubes, which are in particular welded to the glazing frame and which come into engagement with the appertaining bearing shaft on the supporting arm. This mounting is made fast in respect of rotation and position, but is elastic. Through the engagement of internal and external serrations it is possible to obtain such an arrangement in which the supporting tubes are mounted fast in respect of rotation and position in the bearing shafts.

The supporting arms of the side supporting frame are preferably formed of rectangular tubes. The effect is thereby achieved that inside the rectangular cross-sections it is possible to accommodate certain additional parts, for example springing elements. On the supporting frame there is mounted a roof frame which is preferably formed of tubes. The roof frame tubes should preferably be mounted for rotation and sliding inside the upper portions of the supporting arms, in order that the roof frame can be moved towards the rear or towards the front in the direction of travel. For this purpose the supporting arms are constructed in their upper portions, where they receive the roof frame, with releasable clips for such rotatable and slidable connection to the roof frame tubes. This clip connection acts as an energy destroying sliding coupling in the event of torsional or impact loads (for example on the overturning of the vehicle).

The pivoting aid for the front windscreen is preferably mounted, covered over, on or near one of the bearing shafts inside a supporting arm. The pivoting aid may naturally also be exposed, if the supporting arms have a different profile or if for technical reasons this appears advantageous. A pivoting aid is preferably constructed with a link rotatable together with the movement of the windscreen and with a compression spring fastened at one end on the rockable link end and at the other end on the supporting arm. In this way the compression spring co-operates whenever the windscreen is moved (compensation for weight) and also in holding fast the windscreen in the folded down or folded up position. In addition an additional parallelogram spring arrangement can be provided in the side supporting arms. In this case the upper spring arm can be intended as a mounting for the compression spring and the bottom spring arm as a mounting for the shaft.

The unfolded hood can be resiliently fastened by means of known metal-rubber suspensions on the substructure (vehicle body), so that although the necessary fastening is achieved the hood structure is nevertheless protected against vibrations.

The invention is explained more fully below with reference to the drawing, in which:

FIGURE 3 illustrates the protective frame hood in one determined form of construction, in the folded position;

FIGURE 4 shows a sectional side elevation through the bottom portion of a supporting arm with a pivoting aid device;

FIGURE 5 shows a section along the line A–B in FIGURE 4;

FIGURE 6 shows a sectional elevation, turned through 90°, of the pivoting aid device illustrated in FIGURE 4;

Figure 2:
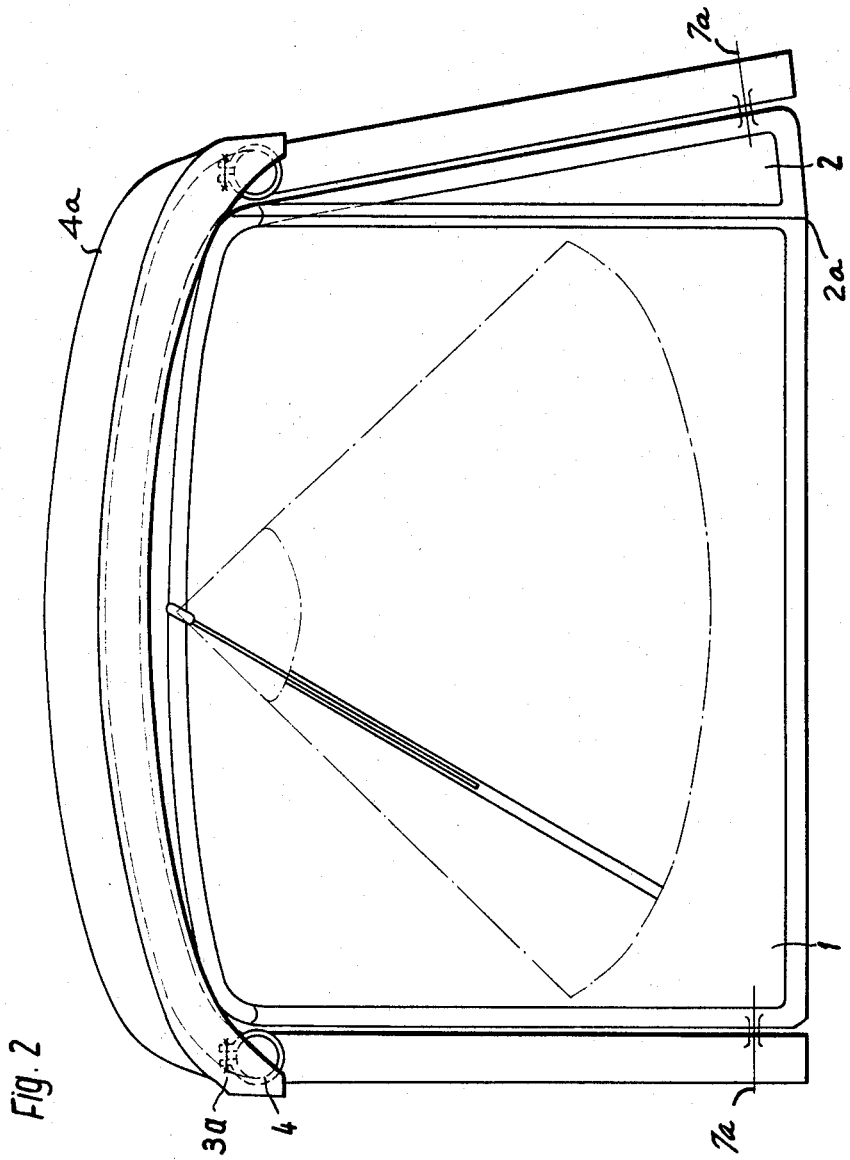
FIGURE 2 shows a front elevation of the hood according to the invention with the front windscreen swung down, in one determined form of construction in which one of the side panes can be partly seen.
Figure 7:
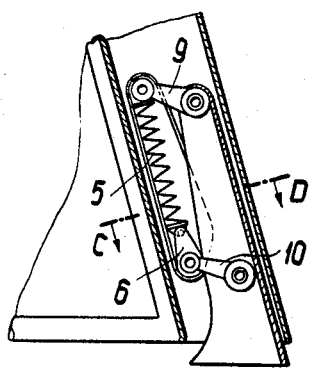
FIGURE 7 shows an embodiment of the invention with an additional parallelogram spring system.
Figure 8:
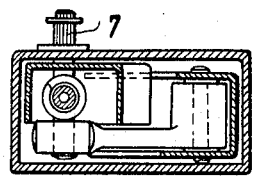
FIGURE 8 shows a section along the line C–D in FIGURE 7.

In the drawing, 1 designates the middle pane of the front windscreen and 2 the respective side panes disposed on the left-hand and right-hand sides linked to pane 1 by hinges 2a, 3 is a supporting arm which at 3a has clips to receive roof frame tubes for a roof 4a, 5 is a compression spring to assist pivoting of the front windscreen, 6 is the appertaining movable link with a bearing shaft 7 having a pivot axis 7a (FIG. 2). As can be seen particularly from a comparison of FIGURES 4, 5 and 6, the supporting arm 3 may be constructed with a rectangular cross-section, in order to receive the spring 5, the link 6 of the pivoting aid, and also the metal-rubber spring system 8, known per se.

Figure 1:
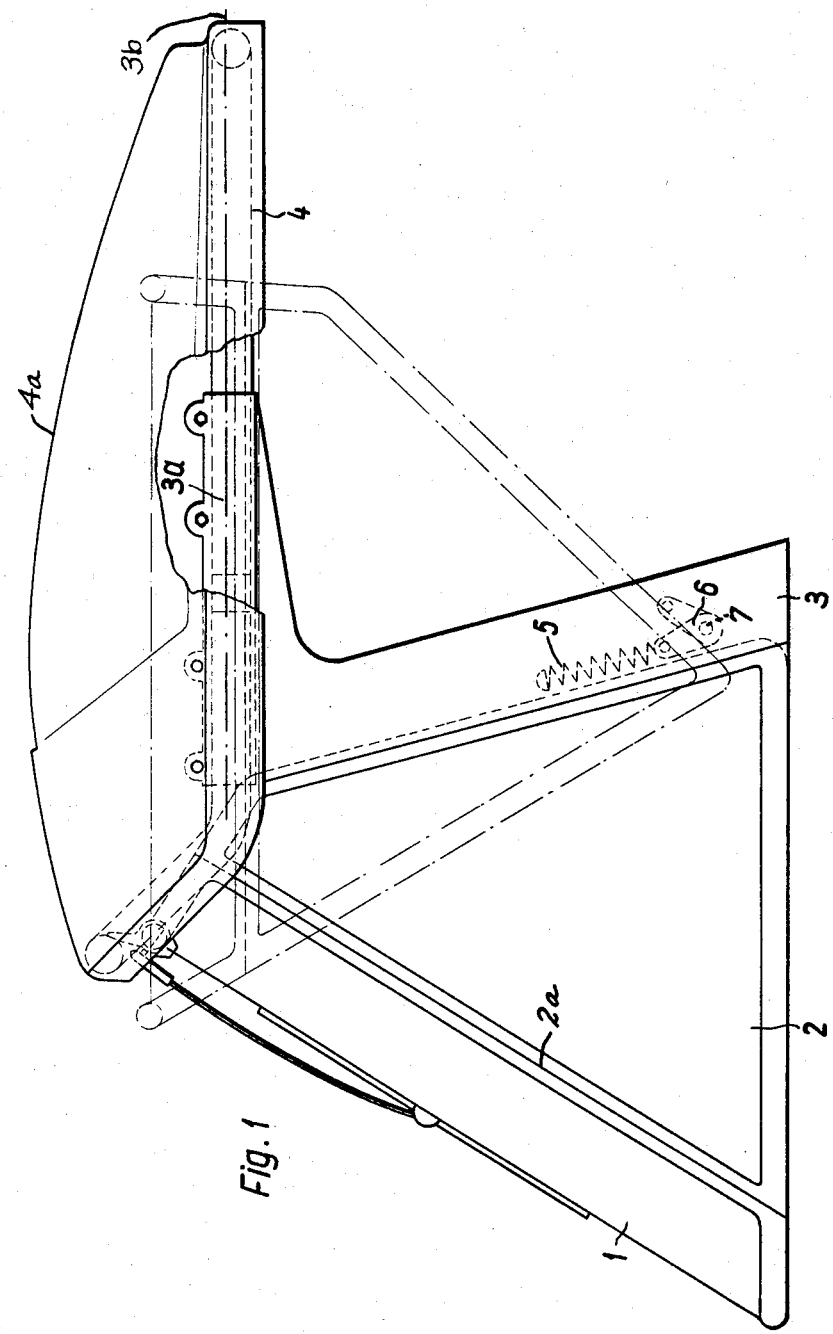
FIGURE 1 shows a side elevation of the protective frame hood according to the invention in one form of construction and with the front windscreen swung down, the raised position being indicated in chain-dotted lines.

The clip 3a and the roof frame tube 4 permit a pivoting movement over a pivot axis 3b (FIG. 1), extending essentially longitudinally of the roof 4a by the side supporting arms 3 and also the sliding of the roof frame, so that heavy stressing of the rear or front roof frame parts can be compensated. In addition, by swinging the supporting arms 3 sideways in relation to the roof frame tubes 4, it is possible to vary the distance between the supporting arms at their bottom edges and hence to adjust the width covered by them to various mudguard spacings, etc. (as seen at the right hand side of FIG. 2).

The side panes 2 of the front windscreen, which are rotatably or pivotally connected to the middle pane 1 at hinges 2a, can in this way yield and move when the entire windscreen assembly is pivoted about the pivot axes 7a. In order to improve pivotability the windscreen assembly is mounted elastically to the supporting arm; this provides spring mounting of the windscreen which rests, secured against rotation by the serrations on the bearing shafts 7 (see FIG. 6).

An additional spring action is achieved by the parallelogram spring system which is preferably rubber-mounted. This parallelogram spring system has an upper spring arm 9 as mounting for the compression spring and a bottom spring arm 10 as mounting for the shaft 7. The advantage of a rubber-mounted parallelogram spring system of this type consists in that the rear torsional thrust spring is fastened on the supporting plate, to be connected to the tractor through safety rings which slip in the direction of rotation when a determined torque is exceeded. In overturning tests in practice it has been found that with this parallelogram spring system the safety rings prevent springing back on overturning (when the torque is exceeded) and through this type of destruction of energy the further overturning of the vehicle is to the greatest possible extent also prevented.

Through the pivoting aid device the effect is achieved that the weight of the front windscreen is partly compensated by the cooperation of the compression spring 5; consequently when it is desired to swing up the windscreen less force actually has to be used in the bottom region, for example in advantageous forms of construction of the hood according to the invention only about 20%, while in the upper pivoting region the compression spring assists the pivoting movement and presses the windscreen into position, for example applies an additional pressure of about 40% in one particular embodiment of the invention. At the same time the open windscreen is securely held in this way during travel.

When the windscreen is swung up, the front entry for the driver is completely freed; nevertheless, the hood structure retains excellent stiffness in the event of overturning, through the supporting arms. If it is desired to fold up the hood, the windscreen is raised about pivot axis 7a; after loosening the clamp screws on the upper parts of the side supporting arms constructed as clips, the left-hand and right-hand supporting arms, including the side panes fastened on them can be swung inwards, after lifting the roof about axes 2a; the middle pane is then raised completely over the axis 7a and, the side panes and supporting arms, folded over axis 3b to come within the contour of the tractor roof 4a; a flat folded arrangement of the entire hood structure is thus obtained, while at the same time the windscreen is protected and less likely to be damaged.

In use the adjustable hood according to the invention provides on the one hand a protective frame which gives safety in the event of overutrning and which is strong enough to prevent the driver from being crushed in the event of the overturning of the vehicle, while on the other hand it permits technically simple and easy mounting and removal of a handy, light hood. In addition, through the suspension of a front windscreen and the appertaining side and rear panelling parts and of a corresponding fixed or loose front protective part this hood forms a complete hood similar to a cab; a cab of this type permits front entry and thus keeps free the side and rear portions of the working machine equipped with the hood, for use with other working implements.

Through the front entry, the protection in the event of overturning, and the complete foldability of the adjustable protective frame hood according to the invention, said hood has unlimited possibilities of use.

What is claimed is:

1. A protective and adjustable hood assembly for the cab of a vehicle comprising:

a roof member (4a)

a wind screen assembly (1,2)

two support members (3) adapted to be attached to the side of the vehicle and extending upwardly to support said roof member (4a) and said windscreen assembly (1,2);

a pivot connection (3a) having a pivot axis (3b) essentially extending longitudinally of said roof member (4a) and mounting said roof member upon the upper ends of said support members (3) so that the support members (3), when detached from the vehicle, can be swung upwards beneath the roof member;

said windscreen assembly (1,2) comprising a central panel (1) and two side panels (2) hinged to the central panel along a hinge axis (2a)

a pair of pivot members (6,7), one each pivotally connecting the rear lower extremity of a side panel (2) to a respective support member (3) near the lower end thereof, the pivot axis (7a) of each pivot member being substantially transverse to the respective support member (3) so that the windscreen assembly can be swung about said pivot axis (7a) so that the central panel (1) lies beneath the roof member (4a) and the hinge axes (2a) of the side panels (2) are in a plane parallel to the pivot axis (3b) of the pair of pivot members (3a) and to permit swinging of each support member (3), when detached from the vehicle, inwardly beneath the roof member (4a), together with the side panels (2).

2. The structure of claim 1 in which each pivot member is rotatably mounted at one end in the lower portion of the support member, and engages with a corresponding side panel of the windscreen assembly, said pivot member terminating at its other end in a lever arm;

a compression spring is mounted between a fixed position upon said support member and the end of the lever arm;

the lever arm and the spring acting together to bias the windscreen assembly to either a fully-down or a fully-up position.

3. The structure of claim 1 in which the roof member is constructed with a tubular frame and the pivot connection of said support members to said roof member is a releasable clamping strap surrounding the tubular frame and being mounted upon the support members.

4. The structure of claim 2 in which the torsional engagement of the side panel frames with the pivot point members permits limited axial movement of the side panel frame along the pivot point member to full disengagement.

5. The structure of claim 2 in which at least the lower portion of each support member is of box-like cross-section, the pivot member, lever arm and compression spring being mounted internally therein, a bracket for attaching the support member to the vehicle extending upwardly thereinto, and a deformable vibration-absorbing connecting member between said bracket and said support arm.

References Cited

UNITED STATES PATENTS

| Re. 15,499 | 12/1922 | Buch | 296—117 |
| 1,447,060 | 2/1923 | Boughton | 49—206 X |
| 2,244,182 | 6/1941 | Allen | 49—205 |
| 3,101,215 | 8/1963 | Fritzmeier | 296—102 |

BENJAMIN HERSH, *Primary Examiner.*

C. C. PARSONS, J. SIEGEL, *Assistant Examiners.*